US007198395B2

(12) United States Patent
Yamamura

(10) Patent No.: US 7,198,395 B2
(45) Date of Patent: Apr. 3, 2007

(54) VEHICLE HEADLAMP

(75) Inventor: Satoshi Yamamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 22 days.

(21) Appl. No.: 11/226,334

(22) Filed: Sep. 15, 2005

(65) Prior Publication Data

US 2006/0062011 A1 Mar. 23, 2006

(30) Foreign Application Priority Data

Sep. 17, 2004 (JP) ........................ P. 2004-271143

(51) Int. Cl.
*B60Q 1/06* (2006.01)

(52) U.S. Cl. ...................................... 362/538; 362/539

(58) Field of Classification Search ................ 362/538
See application file for complete search history.

(56) References Cited

U.S. PATENT DOCUMENTS 4,772,987 A * 9/1988 Kretschmer et al. ........ 362/539
6,059,435 A * 5/2000 Hamm et al. ............... 362/514
6,454,448 B2 * 9/2002 Taniuchi et al. ............ 362/517
6,953,272 B2 * 10/2005 Hayakawa et al. ......... 362/517
2005/0117363 A1 * 6/2005 Yamamura et al. ......... 362/518

FOREIGN PATENT DOCUMENTS

DE 19911599 C1 * 11/2000
DE 102004005284 A1 * 12/2004
JP 2001-229715 A 8/2001

* cited by examiner

*Primary Examiner*—Ali Alavi
*Assistant Examiner*—Hargobind S. Sawhney
(74) *Attorney, Agent, or Firm*—Sughrue Mion, PLLC

(57) ABSTRACT

A part of a reflector is constituted to be able to separate from other general reflecting portion to move downward as a movable reflecting portion. A first additional reflector for reflecting light from a light source to direct forward is arranged at a vicinity on a rear side of the movable reflecting portion. A second additional reflector for reflecting light from the light source to direct forward without transmitting through a projection lens is arranged at a position contiguous downward from the first additional reflector.

11 Claims, 11 Drawing Sheets

VEHICLE HEADLAMP

The present application claims foreign priority based on Japanese Patent Application No. P.2004-271143, filed on Sep. 17, 2004, the contents of which are incorporated herein by reference.

BACKGROUND OF THE INVENTION

1. Field of the Invention

The present invention relates to a projector type vehicle headlamp.

2. Related Art

There is a projector type vehicle headlamp constituted such that a projection lens is arranged on an optical axis extended in a vehicle front and rear direction, a light source is arranged on a side rearward from a rear side focal point thereof, and light from the light source is reflected to be proximate to an optical axis by a reflector. Further, when a light distribution pattern for low beam is formed by the vehicle headlamp of the projector type, a part of reflected light from the reflector is blocked by a shade arranged such that an upper end edge thereof is disposed at a vicinity of the optical axis at a vicinity of the rear side focal point of the projection lens to thereby form a predetermined cutoff line at an upper end portion of the light distribution pattern for low beam.

Disclosed in JP-A-2001-229715 is a projector type vehicle headlamp constituted such that by arranging a first additional reflector on a front skewed lower side of a light source and arranging a second additional reflector on an upper side of the light source to be contiguous to a reflector, light from the light source is successively reflected by the first additional reflector and the second additional reflector and constituted such that by arranging a shutter between the first additional reflector and the second additional reflector, reflected light from the first additional reflector can be prevented from being incident on the second additional reflector.

In order to promote optical recognizability of a vehicle front road face by irradiating light from a vehicle headlamp, it is preferable to form a plurality of kinds of light distribution patterns in accordance with a vehicle running situation even in the same light distribution pattern for low beam.

According to the vehicle headlamp of JP-A-2001-229715, although the light distribution pattern for low beam can be formed by two kinds of modes of a normal light distribution pattern for low beam and a light distribution pattern for low beam constituted by adding the light distribution pattern formed by light successively reflected by the first and the second additional reflectors to the light distribution pattern for low beam. However, the light distribution pattern for low beam cannot be formed by modes more than the two kinds of modes.

Such a problem can similarly be posed even when a light distribution pattern for high beam or the like is formed, in the vehicle headlamp of JP-A-2001-229715.

SUMMARY OF THE INVENTION

One or more embodiments of the present invention provide a vehicle headlamp capable of forming a light distribution pattern by three kinds of modes.

In accordance with one or more embodiments of the present invention, a vehicle headlamp capable of forming a light distribution pattern by three kinds of modes is provided, by separating a part of a reflector to constitute a movable type, thereafter, arranging a predetermined first additional reflector at a vicinity on a rear side thereof, and arranging a predetermined second additional reflector at a position substantially contiguous thereto.

In accordance with one or more embodiments of the present invention, a vehicle headlamp is provided with: a projection lens arranged on an optical axis extended in a front and rear direction of a vehicle; a light source arranged on a side rearward from a rear side focal point of the projection lens; a reflector for reflecting light from the light source to direct forward to be proximate to the optical axis, the reflector including a general reflecting portion and a movable reflecting portion movable in a predetermined direction to separate from the general reflecting portion; a first additional reflector, arranged at a vicinity of a rear side of the movable reflecting portion, for reflecting the light from the light source to direct forward; and a second additional reflector, arranged at a position substantially contiguous to the first additional reflector in the predetermined direction, for reflecting the light from the light source to direct forward without transmitting through the projection lens.

Moreover, in accordance with one or more embodiments of the present invention, when the movable reflecting portion is moved in the predetermined direction so as to be separated from the general reflecting portion, the light from the light source is incident to the first additional reflector through a gap between the movable reflecting portion and the general reflecting portion, and when the movable reflecting portion is moved in the predetermined direction by a predetermined amount, the light directed to the second additional reflector from the light source is blocked by the movable reflecting portion.

A light distribution pattern formed by irradiating light from the vehicle headlamp according to one or more embodiments of the present invention may be a light distribution pattern for a low beam, may be a light distribution pattern for a high beam, or other light distribution pattern.

A kind of the "light source" is not particularly limited but, for example, a discharge light emitting portion of a discharging bulb, a filament of a halogen bulb or the like can be adopted. Further, a specific constitution of a specific position, direction or the like of the "light source" is not particularly limited so far as the "light source" is arranged on a side rearward from a rear side focal point of the projection lens.

A specific position or a size or a shape of a reflecting face or the like of the "movable reflecting portion" is not particularly limited so far as the "movable reflecting portion" is a portion of the reflector and constituted to be able to separate from other general reflecting portion of the reflector to move in the predetermined direction. Further, a mode of "movement" of the movable reflecting portion is not particularly limited but, for example, movement by linear movement or movement by pivoting movement or the like can be adopted. Further, the mode of the "movement" may be a mode of movement such that only two positions of a first position before being separated and a second position moved downward from the position by a predetermined amount can be adopted, or may be a mode of movement such that at least one position between the two positions can be adopted in steps or steplessly.

A specific direction of the "predetermined direction" is not particularly limited but, for example, a downward direction, an upper direction or either of left and right directions or the like can be adopted.

A size, a specific shape of a reflecting face or the like of the "first additional reflector" is not particularly limited so far as the "first additional reflector" is arranged at a vicinity of a rear side of the movable reflector and constituted to reflect light from the light source to direct frontward. In this case, the first additional reflector may be constituted to make light from the light source reflected by the first additional reflector incident on the projection lens, or the first additional reflector may be constituted not to make light from the light source incident on the projection lens.

A size, a specific shape of a reflecting face or the like of the "second additional reflector" is not particularly limited so far as the second additional reflector is arranged at a position substantially contiguous to the first additional reflector in the predetermined direction and is constituted to reflect the light from the light source to direct forward without transmitting through the projection lens. Here, the "position substantially contiguous in the predetermined direction" signifies to include not only a position completely contiguous thereto in the predetermined direction but also a position more or less remote therefrom in the predetermined direction.

Further, in accordance with one or more embodiments of the present invention, a vehicle headlamp is structured so that, a part of the reflector is constituted to be able to separate from the other general reflecting portion of the reflector to move in a predetermined direction as a movable reflecting portion, a first additional reflector for reflecting the light from the light source to direct forward is arranged at a vicinity of the rear side of the movable reflecting portion, the second additional reflector for reflecting the light from the light source to direct forward without transmitting through the projection lens is arranged at the position substantially contiguous in the predetermined direction to the first additional reflector. Further, when the movable reflecting portion is separated from the general reflecting portion to move in the predetermined direction, light from the light source is made to be incident on the first additional reflector through the gap between the movable reflecting portion and the general reflecting portion, and when the movable reflecting portion is moved in the predetermined direction by a predetermined amount, the light directed to the second additional reflector from the light source is constituted to be substantially blocked by the movable reflecting portion. Therefore, the following operational effect can be achieved.

That is, at the reference position at which the movable reflecting portion is not separated from the general reflecting portion, reflected light from the general reflecting portion of the reflector, reflected light from the movable reflecting portion of the reflector and reflected light from the second additional reflector can be irradiated forward.

Further, at the first moving position at which the movable reflecting portion is separated from the general reflecting portion and moved to some degree in the predetermined direction, whereas light from the light source is incident on the first additional reflector through the gap between the movable reflecting portion and the general reflecting portion, a part of the light from the light source to be incident on the second additional reflector can be made to be blocked by the movable reflecting portion. Further, thereby, reflected light from the general reflecting portion of the reflector, reflected light from apart of the first additional reflector, and reflected light from a part of the second additional reflector can be irradiated forward. At this occasion, depending on an attitude of the movable reflecting portion, also a part of reflected light from the movable reflecting portion can be irradiated forward.

Further, at the second moving position at which the movable reflecting portion is further moved in the predetermined direction (that is, moved by a predetermined amount), whereas the light from the light source is incident substantially on an entire region of the first additional reflector through the gap between the movable reflecting portion and the general reflecting portion, most of light from the light source to be incident on the second additional reflector can be blocked by the movable reflecting portion. Further, thereby, reflected light from the general reflecting portion of the reflector and reflected light from the first additional reflector can be irradiated forward.

Therefore, the light distribution pattern can be formed by three kinds of modes by moving the movable reflecting portion of the reflector to any position of the reference position, the first moving position and the second moving position. Further, thereby, optical recognizability of the vehicle front road face can be promoted by forming the light distribution pattern in accordance with a vehicle running situation. Further, the light distribution pattern can be realized by driving a single actuator.

Further, the vehicle headlamp is structured by the constitution of switching the modes by moving the movable reflecting portion having a light reflection control function and therefore, in comparison with the case of switching the modes by opening and closing a shutter as in the background art, light from the light source can effectively be utilized.

In addition, in accordance with one or more embodiments of the present invention, in the above-described constitution, the first additional reflector may include a shape of a reflecting face having a high convergence of light to a vicinity of the rear side focal point of the projection lens. Therefore, the light distribution pattern formed by reflected light from the first additional reflector can be formed as a light distribution pattern in a spot-like shape brighter than the light distribution pattern formed by reflected light from the movable reflecting portion. Further, thereby, remote optical recognizability can be promoted at the first moving position than at the reference position and the remote optical recognizabiltiy can be promoted at the second moving position that the first moving position.

Here, the "shape of the reflecting face having a high convergence of light to a vicinity of the rear side focal point" signifies a shape of a reflecting face in which a convergence of light from the light source reflected by the first additional reflector to a vicinity of the rear side focal point is higher than a convergence of light from the light source reflected by the movable reflecting portion of the reflector to the vicinity of the rear side focal point, a specific shape thereof is not particularly limited but, for example, a shape of substantially an ellipsoid of revolution constituting a first focal point by a point at a vicinity of the light source and constituting a second focal point by a point at a vicinity of the rear side focal point of the projection lens or the like can be adopted.

In addition, in accordance with one or more embodiments of the present invention, in the above-described constitution, the second additional reflector may be constituted to reflect the light from the light source to the near distance region of the vehicle front road face. In this case, the following operation and effect can be achieved.

That is, at the reference position, a light distribution pattern suitable for running in an urban area can be provided by brightly irradiating the near distance region of the vehicle front road face by reflected light from the second additional reflector. Further, at the first moving position, by darkening the near distance region of the vehicle front road face by reducing reflected light from the second additional reflector, optical recognizabiltiy of the remote distance region can relatively be promoted, thereby, a light distribution pattern suitable for high speed running or the like can be provided. Further, at the second moving position, by nullifying reflected light from the second additional reflector, a light distribution pattern further suitable for high speed running or the like can be provided. Further, at the second moving position, by nullifying reflected light from the second additional reflector, when the vehicle front road face is wet, regularly reflected light at the near distance region can be reduced and therefore, glare cast to a driver of a vehicle running on an opposite lane can be reduced, thereby, the light distribution pattern suitable for running under rainy weather or the like can be provided.

Although in the above-described constitution, the mode of movement of the movable reflecting portion is not particularly limited as described above. However, in accordance with one or more embodiments of the present invention, the movement of the movable reflector may be constituted to be carried out by a pivoting movement constituting a pivoting center by a point at a vicinity of the light source, at the first moving position, a part of reflected light from the movable reflecting portion can be made to be incident on the projection lens to irradiate forward. Therefore, the light distribution pattern can be prevented from being disturbed significantly beforehand in switching the modes of the reference position and the first moving position or in switching the modes of the first moving position and the second moving position.

In addition, in accordance with one or more embodiments of the present invention, in the above-described constitution, the light source may be constituted by a light emitting portion of a light source bulb inserted to fix to the reflector from aside direction of the optical axis at a position remote downward from the optical axis. In this case, the following operation and effect can be achieved.

That is, by constructing a constitution of inserting to fix the light source bulb to the reflector from the side direction of the optical axis, by shortening a length in a front and rear direction of the lamp piece, compact formation thereof can be achieved. Further, by constructing a constitution of inserting to fix the light source bulb at a position remote downward from the optical axis, a side region of the optical axis of the reflecting face of the reflector can effectively be utilized for controlling light distribution. That is, by forming a diffusion region of the light distribution pattern by reflected light from the side region of the optical axis, sufficient brightness can be ensured at the diffusion region.

At that occasion, a downward displacement amount of the position of inserting to fix the light source bulb from the optical axis is not particularly limited. In this case, from a view point of preventing the light from the light source bulb reflected by the region proximate to the optical axis at the reflecting face of the reflector from being blocked by the light source bulb beforehand, it is preferable to set the downward displacement amount to a value equal to or smaller than 10 mm and it is further preferable to set the downward displacement amount to a value equal to or larger than 15 mm. On the other hand, from a view point of sufficiently ensuring a light flux incident on the reflecting face of the reflector from the light source bulb, it is preferable to set the downward displacement amount value equal to or smaller than 30 mm.

In addition, in accordance with one or more embodiments of the present invention, in the above-described constitution, the movable reflecting portion may be arranged substantially right behind the light source, the second additional reflector may be arranged downward from the movable reflecting portion, and a position of separating an upper end edge of the movable reflecting portion and a lower end edge of the general reflecting portion may be set to a position of a height substantially the same as that of the optical axis. In this case, the following operation and effect can be achieved.

That is, by arranging the movable reflecting portion substantially right behind the light source and arranging the second additional reflector downward from the movable reflecting portion, with regard to any of the general reflecting portion, the movable reflecting portion, the first additional reflector and the second additional reflector, a sufficient incident light flux with respect to the light from the light source can be ensured. Further, by setting the position of separating the upper end edge of the movable reflecting portion and the lower end edge of the general reflecting portion to the position of the height substantially the same as that of the optical axis, all of a reflecting region upward from the optical axis can be ensured as the general reflecting portion. Therefore, a basic light distribution pattern can be formed as a light distribution pattern the diffusion region of which is sufficiently bright by reflected light from the general reflecting portion.

In addition, in accordance with one or more embodiments of the present invention, in the above-described constitution, a shade for blocking a part of reflected light from the reflector may be arranged at a vicinity of the rear side focal point of the projection lens such that an upper end edge is disposed at a vicinity of the optical axis. In this case, a low beam light distribution pattern having a cutoff line at an upper end edge thereof can be formed. Further, at that occasion, when the first additional reflector is constituted to make the light from the light source reflected by the first additional reflector incident on the projection lens, also with regard to a light distribution pattern formed by reflected light from the first additional reflector, the cutoff line can be provided at an upper end edge thereof, thereby, remote optical recognizability can be promoted without casting glare to a driver of a vehicle running on an opposite lane.

In addition, in accordance with one or more embodiments of the present invention, in the above-described constitution, the general reflecting portion and the movable reflecting portion may have respective reflecting faces provided with sectional shapes substantially in elliptically shapes with eccentricities gradually increasing from respective vertical sections to horizontal sections, the first additional reflector may have a reflecting face provided with a shape of an ellipsoid of revolution constituting a first focal point by a light emitting center of the light source and a second focal point at a vicinity of the rear side focal point of the projection lens, and the second additional reflector may have a reflecting face provided with a vertical sectional shape constituted by a parabola having a focal point at the light emitting center of the light source, and a horizontal sectional shape constituted by a hyperbola having a focal point at the light emitting center of the light source.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
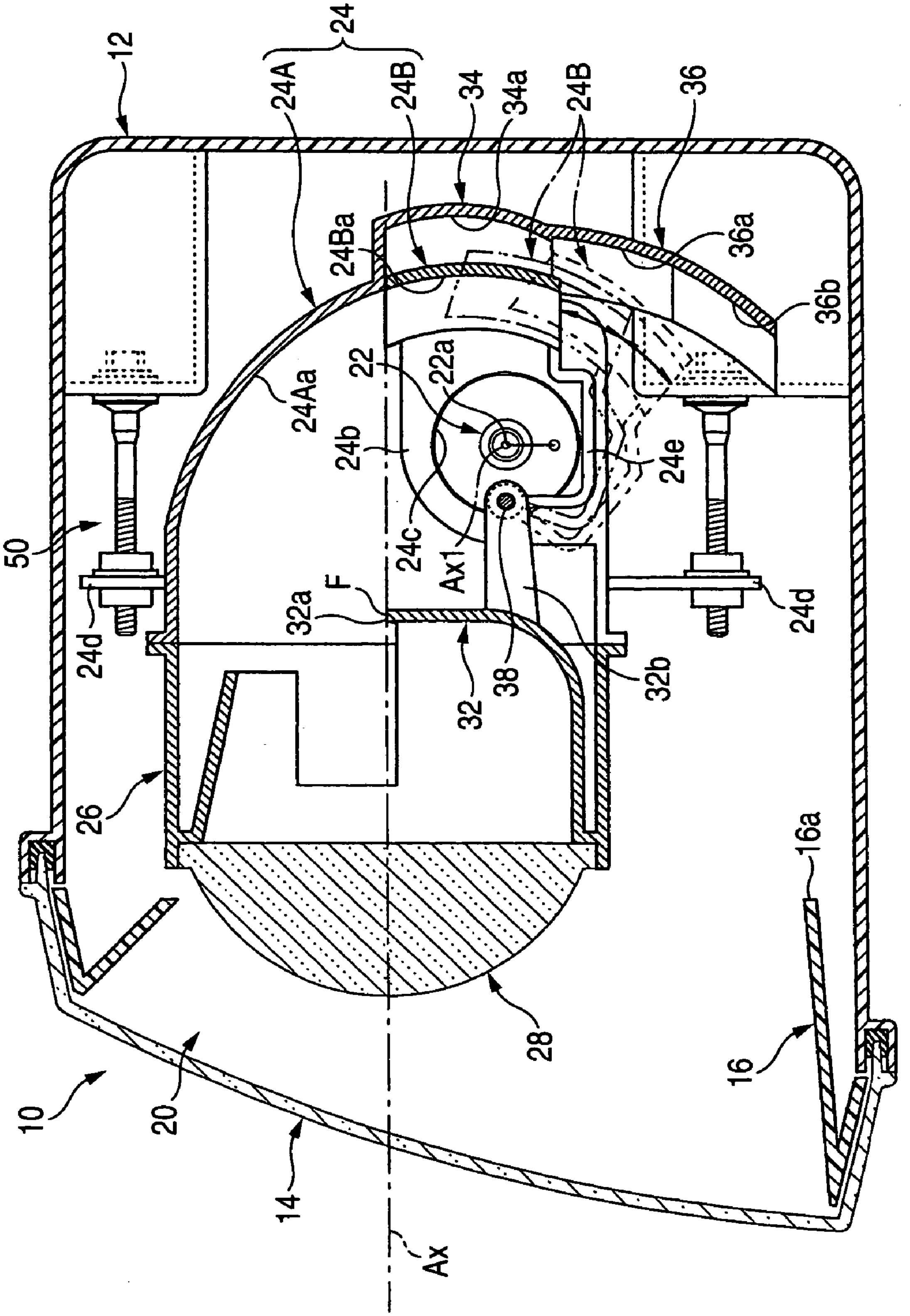
FIG. 1 is a side sectional view showing a vehicle headlamp.

FIG. 1 is a side sectional view showing a vehicle headlamp.

As shown by the drawing, in a vehicle headlamp 10 according to the embodiment, a lighting unit 20 having an optical axis Ax extended in a vehicle front and rear direction is contained in a lamp chamber formed by a lamp body 12 and a light transmitting cover 14 in a transparent state attached to a front end opening portion thereof inclinably in an up and down direction and in a left and right direction by way of an aiming mechanism 50.

Further, at a state of finishing aiming adjustment by the aiming mechanism 50, the optical axis Ax of the lighting unit is extended in a direction downward by about 0.5 through 0.6° relative to the vehicle front and rear direction.

Figure 2:
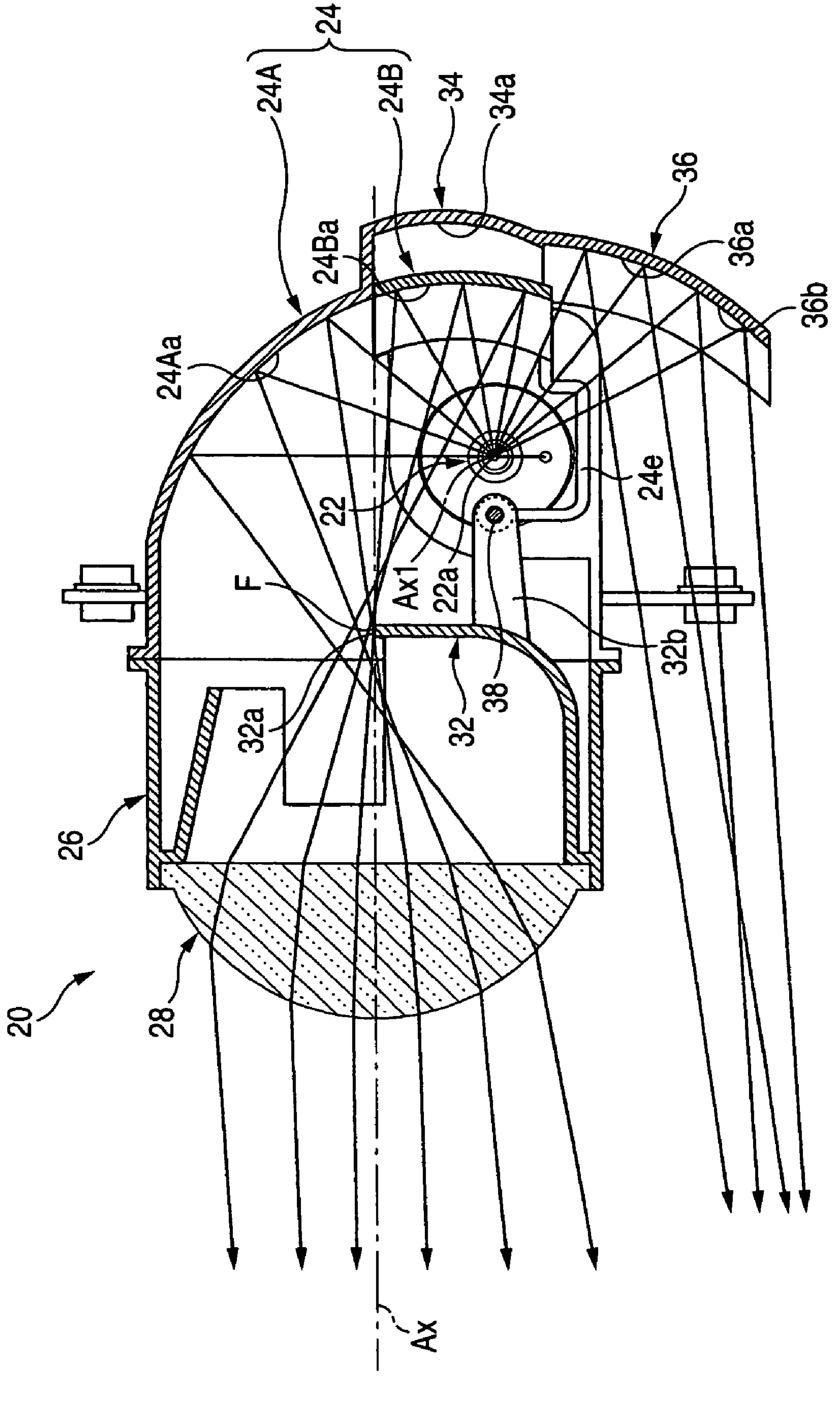
FIG. 2 is a side sectional view showing a single piece of a lighting unit of the vehicle headlamp and is a view showing a light path in a state in which a movable reflecting portion of a reflector is disposed at a reference position.
Figure 3:
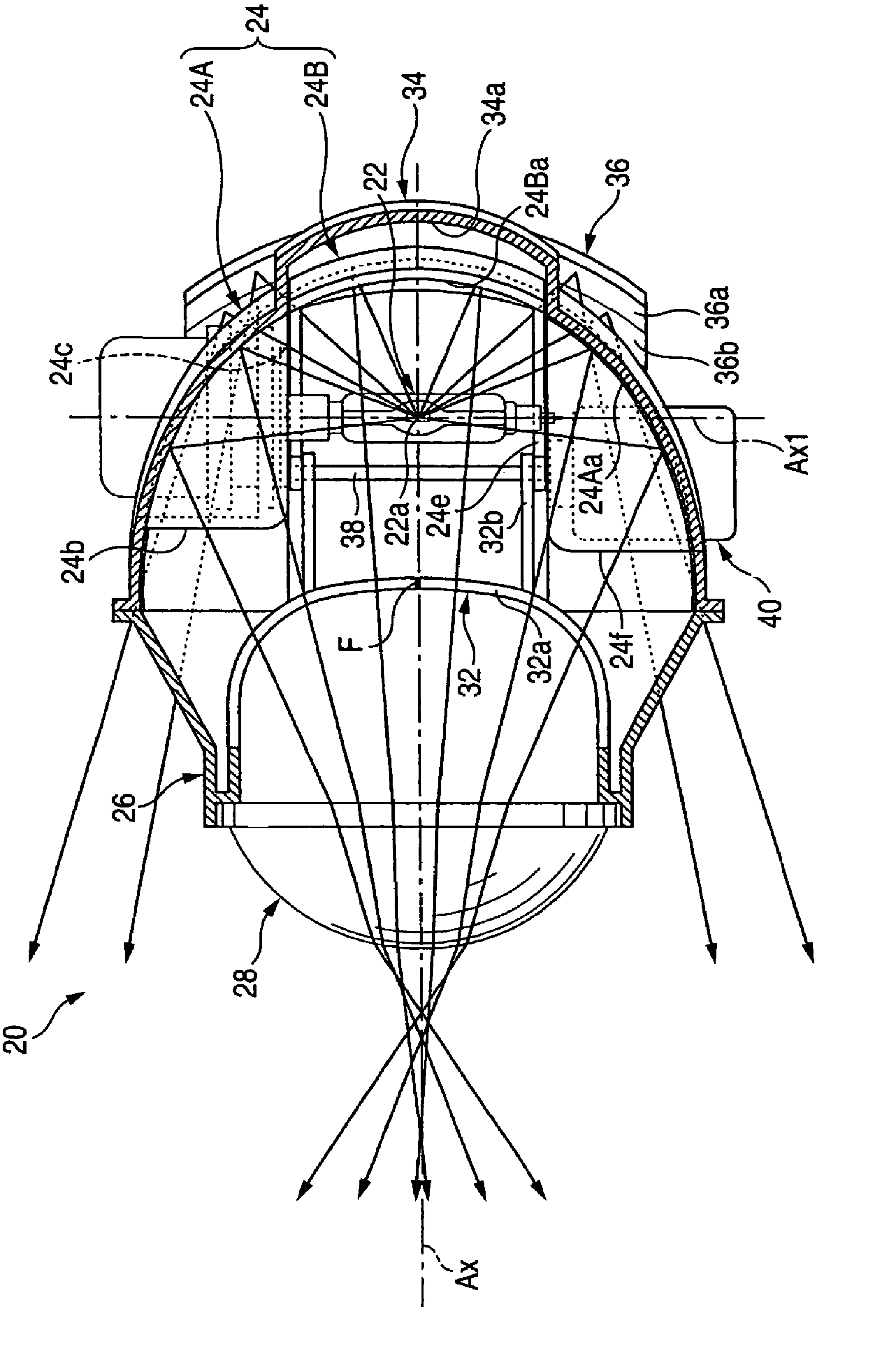
FIG. 3 is a plane sectional view showing the single piece of the lighting unit and is a view showing a light path in the state in which the movable reflecting portion is disposed at the reference position.

FIGS. 2 and 3 are a side sectional view and a plane sectional view showing a single piece of the lighting unit 20.

As shown also by the drawings, the lighting unit 20 is a lighting unit of a projector type and is constituted by including a light source bulb 22, a reflector 24, a holder 26, a projection lens 28, a shade 32, a first additional reflector 34, and a second additional reflector 36.

The projection lens 28 comprises a flat convex lens a front side surface of which is constituted by a convex face and a rear side surface of which is constituted by a flat face, and arranged on the optical axis Ax. Further, the projection lens 28 projects an image on a focal point face including a rear side focal point F thereof forward as an inverted image.

The light source bulb 22 is a discharge bulb of a metal halide bulb or the like constituting a light source 22*a* by a charge light emitting portion and the light source 22*a* is constituted as a line segment light source extended in a direction of a bulb center axis Ax1. Further, the light source bulb 22 is inserted to fix to the reflector 24 from a right side direction of the optical axis Ax at a position on a side rearward from the rear side focal point F of the projection lens 28 and remote downward from the optical axis Ax (for example, position remote downward from the optical axis Ax by about 20 mm). The light source bulb 22 is inserted to fix thereto such that a light emitting center of the light source 22*a* is positioned vertically downward from the optical axis Ax in a state of setting the bulb center axis Ax1 to extend in a horizontal direction in a vertical face orthogonal to the optical axis Ax.

The reflector 24 comprises a movable reflecting portion 24B disposed substantially right behind the light source 22*a* and a general reflected portion 24A other than the movable reflecting portion 24B and is constituted to reflect light from the light source 22*a* proximate to the optical axis Ax in a forward direction. Further, the reflector 24 is supported by the lamp body 12 via the aiming mechanism 50 at aiming brackets 24*d* formed at three portions of a surrounding thereof.

According to the reflector 24, a reflecting face 24Aa of the general reflecting portion 24A and a reflecting face 24Ba of the movable reflecting portion 24B are formed by continuous surface shapes. In this case, the respective reflecting faces 24Aa, 24Ba are provided with sectional shapes substantially in an elliptically shape and eccentricities thereof are set to gradually increase from a vertical section to a horizontal section. Further, the respective reflecting faces 24Aa, 24Ba substantially converge light from the light source 22*a* reflected by the reflecting faces 24Aa, 24Ba to vicinities of the rear side focal point F in the vertical section and move converging positions thereof considerably forward.

The reflecting face 24Ba of the movable reflecting portion 24B is provided with an outer shape in a rectangular shape prolonged laterally in a front view of the lighting unit, and the reflecting face 24Aa of the general reflecting portion 24A is formed to surround the movable reflecting portion 24B from an upper side and both left and right sides thereof. In this case, the reflecting face 24Ba of the movable reflecting portion 24B is formed over a range of about 20 mm respectively on both left and right sides of the optical axis Ax and a range of about 25 mm downward from a height of the optical axis Ax. Further, a lower right side region of the general reflecting portion 24A is formed with a bulb inserting and fixing portion 24*b* and a bulb inserting hole 24*c* is formed at a left side face portion of the bulb inserting and fixing portion 24*b*.

The movable reflecting portion 24B is constituted to be able to move downward by being separated from the general reflecting portion 24A. That is, lower end portions of both sides of the movable reflecting portion 24B are formed with a pair of left and right brackets 24*e* extended to a vicinity of a front side of the light source 22*a* (for example, front side by about 10 mm relative to the bulb center axis Ax1) and a pivoting shaft member 38 extended in a vehicle width direction is press-fit to fix to a front end portion of the bracket 24*e*.

The pivoting shaft member 38 is connected to an output shaft of a stepping motor 40 at a left end portion thereof. The stepping motor 40 is fixedly supported by the reflector 24 at a motor support portion 24*f* formed at a lower left side region of the general reflecting portion 24A of the reflector 24.

Further, by driving the stepping motor 40, the movable reflecting portion 24*b* is pivoted around an axis line thereof along with the pivoting shaft member 38 and is made to be able to take a reference position indicated by a bold line in FIG. 1 (that is, a position at which the movable reflecting portion 24B is not separated from the general reflecting portion 24A), a first moving position indicated by a two-dotted chain line in the drawing (that is, a position at which the movable reflecting portion 24B is separated from the general reflecting portion 24A to move downward to some degree), and a second moving position indicated by a one-dotted chain line in the drawing (that is, a position at which the movable reflecting portion 24B is moved further downward from the first moving position).

Figure 4:
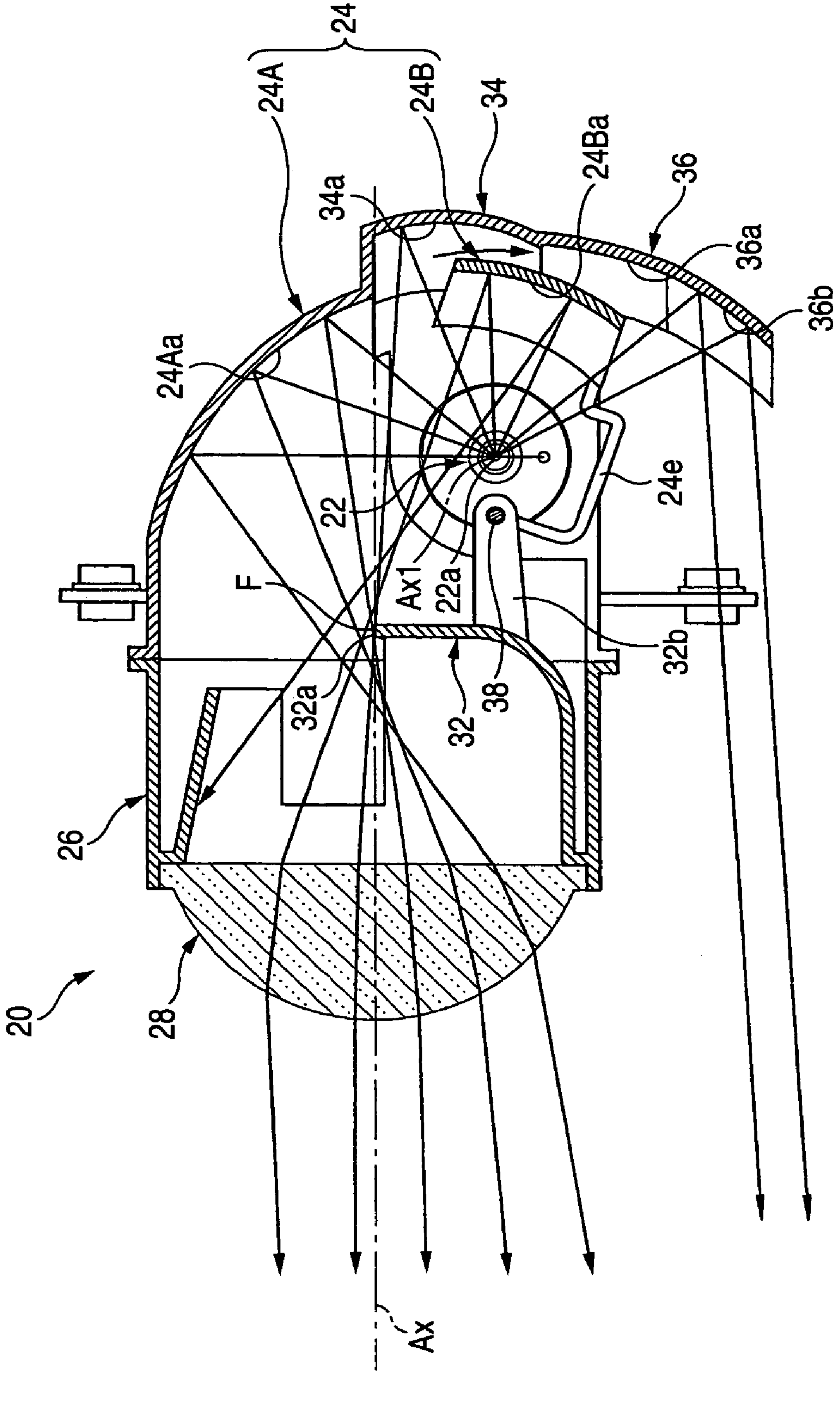
FIG. 4 is a side sectional view showing the single piece of the lighting unit and is a view showing a light path in a state in which the movable reflecting portion is disposed at a first moving position.
Figure 5:
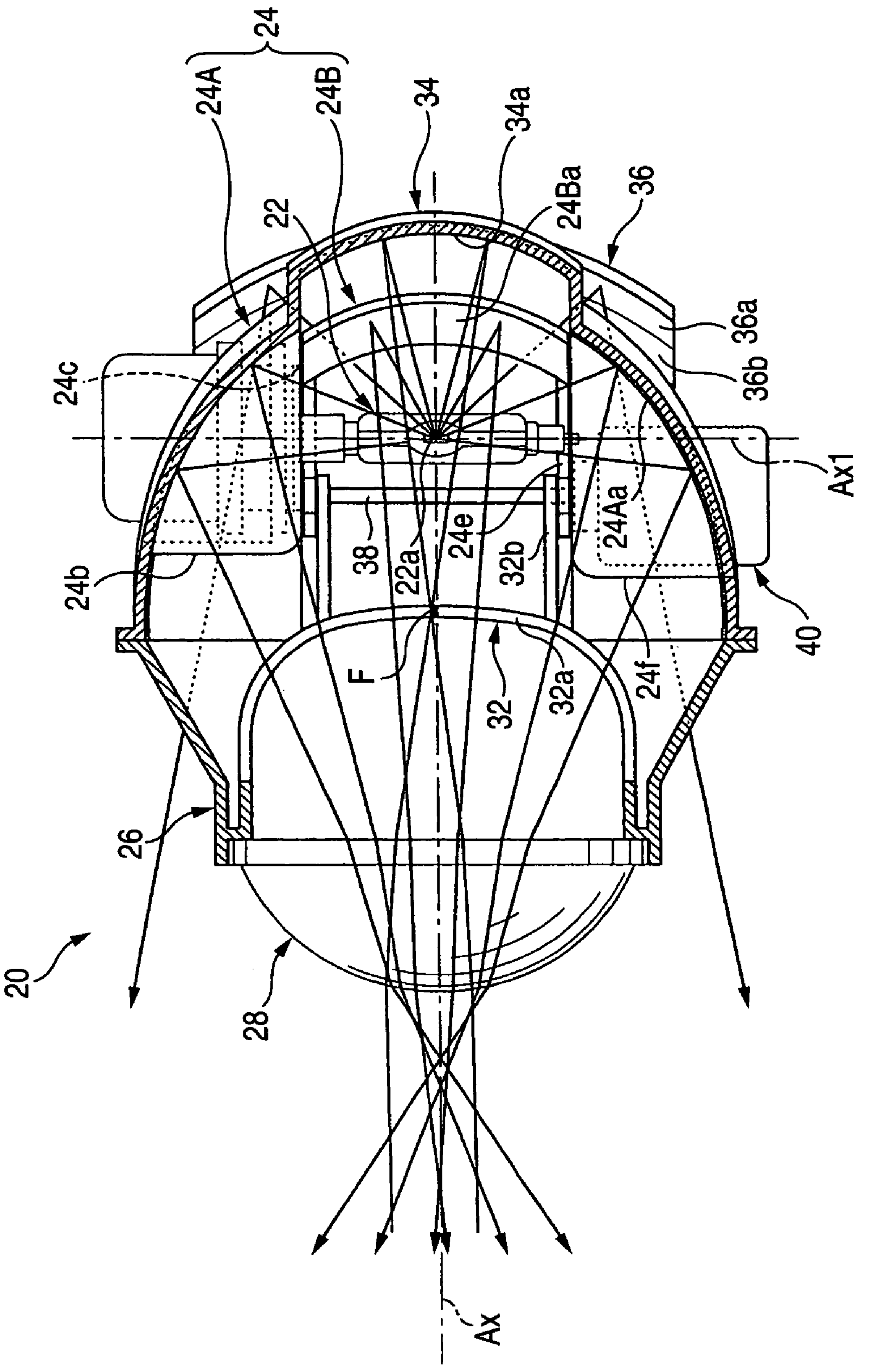
FIG. 5 is a plane sectional view showing the single piece of the lighting unit and is a view showing the light path in the state in which the movable reflecting portion is disposed at the first moving position.
Figure 6:
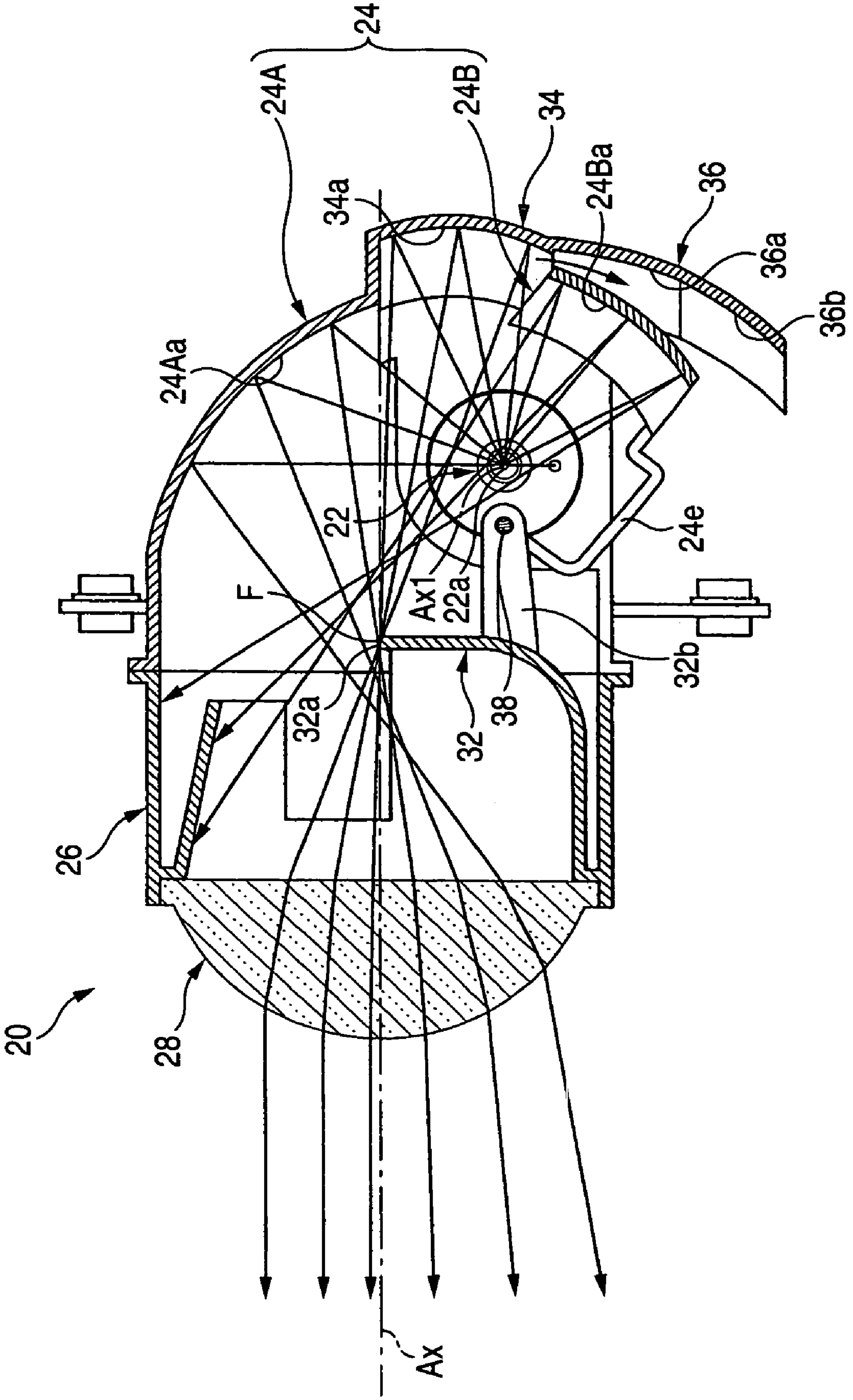
FIG. 6 is a side sectional view showing the single piece of the light piece unit and is a view showing a light path in a state in which the movable reflecting portion is disposed at a second moving position.
Figure 7:
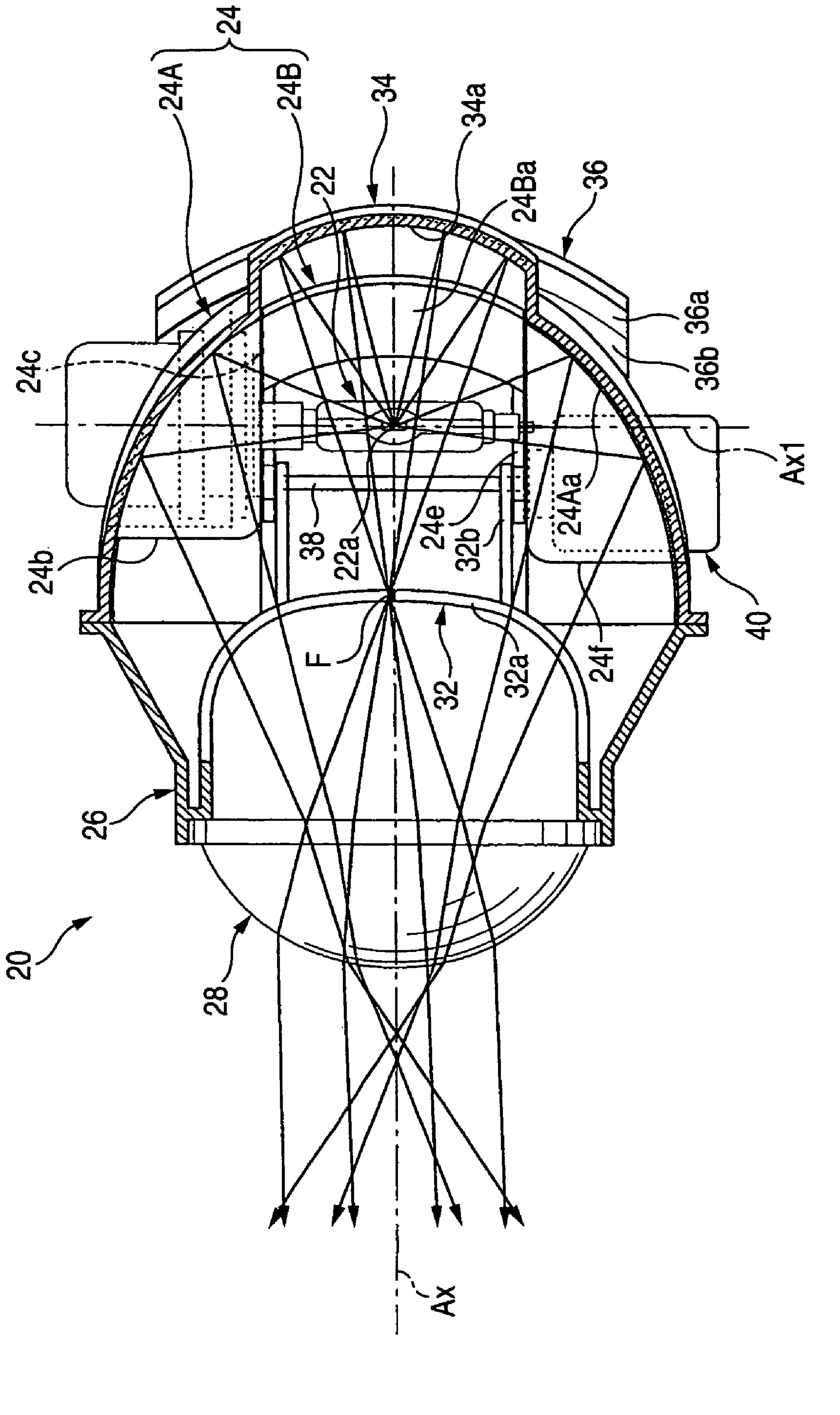
FIG. 7 is a plane sectional view showing the single piece of the light piece unit and is a view showing the light path in the state in which the movable reflecting portion is disposed at the second moving position.

FIGS. 2 and 3 show a light path of light from the light source 22*a* in a state in which the movable reflecting portion 24B is disposed at the reference position. Further, FIGS. 4 and 5 show a light path of light from the light source 22*a* in a state in which the movable reflecting portion 24B is disposed at a first moving position, and FIGS. 6 and 7 show a light path of light from the light source 22*a* in a state in which the movable reflecting portion 24B is disposed at a second moving position.

The stepping motor 40 is driven based on a control signal from a control unit, not illustrated, in accordance with a vehicle running situation. Specifically, a position of pivoting the movable reflecting portion 24B is fixed at the reference position in a low and middle vehicle speed region equal to or slower than 60 km/h, on the other hand, at a high vehicle speed region exceeding 60 km/h, the position is fixed to the first moving position, further, in running under rainy weather, the position is fixed to the second moving position.

A first additional reflector 34 is provided at a vicinity on a rear side of the movable reflecting portion 24B of the reflector 24 and is integrally formed with the general reflecting portion 24A of the reflector 24.

A reflecting face 34*a* of the first additional reflector 34 is provided with an outer shape in the rectangular shape prolonged laterally in front view of the lighting unit, and formed over a range of about 20 mm respectively on both left and right sides of the optical axis Ax and a range from a height of the optical axis Ax to about 23 mm downward therefrom. Further, when the movable reflecting portion 24B of the reflector 24 is separated from the general reflecting portion 24A to move downward, the first additional reflector 34 makes light from the light source 22*a* incident thereon through a gap between the two reflecting portions 24A, 24B and reflects the incident light frontward to be proximate to the optical axis Ax.

In this case, a surface shape of the reflecting face 34*a* of the first additional reflector 34 is set to a shape of an ellipsoid of revolution constituting a first focal point by a light emitting center of the light source 22*a* and constituting a second focal point by a point at a vicinity of the rear side focal point F of the projection lens 28 (specifically, a point disposed slightly on the right side of the rear side focal point F), thereby, convergence of light to a vicinity of the rear side focal point F is maximally promoted.

The second additional reflector 36 is arranged to be contiguous to a lower side of the first reflector 34 and is integrally formed with the first additional reflector 34. Further, the second additional reflector 36 reflects light from the light source 22*a* forward without transmitting through the projection lens 28 and through a space on a lower side thereof.

A reflecting face of the second additional reflector 36 is constituted by an upper reflecting face 36*a* and a lower reflecting face 36*b*. The upper reflecting face 36*a* and the lower reflecting face 36*b* are constituted by parabolas constituting focal points by the light emitting center of the light source 22*a* in vertical sectional shapes thereof, and constituted by hyperbolas constituting focal points by the light emitting center of the light source 22*a* in horizontal sectional shapes, thereby, light from the light source 22*a* reflected by the second additional reflector 36 is diffused in a left and right direction without being diffused in an up and down direction.

In this case, the upper reflecting face 36*a* constitutes an axis of the parabolaby an axis line directed downward relative to the optical axis Ax to some degree, and the lower reflecting face 36*b* constitutes an axis of the parabola by an axis line directed slightly downward relative to the optical axis Ax. Further, thereby, whereas the upper reflecting face 36*a* reflects light from the light source 22*a* to a near distance region of the vehicle front road face, the lower reflecting face 36*b* reflects light from the light source 22*a* in a direction slightly upward from the reflected light from the upper reflecting face 36*a*.

The holder 26 is formed to extend substantially in a cylindrical shape to front side from the front end opening portion of the reflector 24, fixedly supported by the reflector 24 at a rear end portion thereof and fixedly supports the projection lens 28 at a front end portion thereof.

The shade 32 is integrally formed with the holder 26 to be disposed substantially at a lower half portion of an inner space of the holder 26. The shade 32 is formed such that an upper end edge 32*a* thereof passes the rear side focal point F of the projection lens 28, thereby, a part of reflected light from the reflecting faces 24Aa, 24Ba of the reflector 24 and the reflecting face 34*a* of the first additional reflector 34 is blocked to remove most of upward light emitted frontward from the projection lens 28. Further, a rear face of the shade 32 is formed with a pair of left and right brackets 32*b* projected rearward, and both end portions of the pivoting shaft member 38 are supported by rear end portions of the two brackets 32*b*.

As shown by FIGS. 2 and 3, at the reference position at which the movable reflecting portion 24B is not separated from the general reflecting portion 24A, light from the light source 22*a* is incident on the reflecting face 24Aa of the general reflecting portion 24A, the reflecting face 24Ba of the movable reflecting portion 24B, and the upper reflecting face 36a and the lower reflecting face 36b of the second additional reflector 36. At this occasion, light from the light source 22a directed to the reflecting face 34a of the first additional reflector 34 is blocked by the movable reflecting portion 24B.

Further, at the reference position, reflected light from the reflecting face 24Aa of the general reflecting portion 24A, and reflected light from the reflecting face 24Ba of the movable reflecting portion 24B are irradiated forward by transmitting through the projection lens 28, and reflected light from the upper reflecting face 36a and the lower reflecting face 36b of the second additional reflector 36 is irradiated forward without transmitting through the projection lens 28.

As shown by FIGS. 4 and 5, at the first moving position at which the movable reflecting portion 24B is separated from the general reflecting portion 24A to move downward to some degree, light from the light source 22a directed to a lower region of the reflecting face 34a of the first additional reflector 34, and an upper reflecting face 36a of the second additional reflector 36 is blocked by the movable reflecting portion 24B. Therefore, light from the light source 22a is incident on the reflecting face 24Aa of the general reflecting portion 24A, the reflecting face 24Ba of the movable reflecting portion 24B, the upper region of the reflecting face 34a at the first additional reflector 34 and the lower reflecting face 36b of the second additional reflector 36.

Further, at the first moving position, reflected light from the reflecting face 24Aa of the general reflecting portion 24A, reflected light from the reflecting face 24Ba of the movable reflecting portion 24B, and reflected light from the upper region of the reflecting face 34a of the first additional reflector 34 are irradiated forward by transmitting through the projection lens 28, and reflected light from the lower reflecting face 36b of the second additional reflector 36 is irradiated forward without transmitting through the projection lens 28. However, at this occasion, a direction of the reflecting face 24Ba of the movable reflecting portion 24B is changed to an upper direction by pivoting the movable reflecting portion 24B and therefore, in reflected light from the reflecting face 24Ba, only reflected light from an upper region thereof is incident on the projection lens 28 to emit forward and reflected light from a lower region thereof becomes ineffective light without being incident on the projection lens 28.

The movable reflecting portion 24B is moved by pivoting movement constituting a pivoting center by the pivoting shaft member 38 extended in the vehicle width direction at a vicinity of front side of the light source 22a and therefore, the direction of reflected light from the movable reflecting portion 24B becomes substantially the same direction at the reference position and the first moving position. Therefore, the direction of reflected light from the upper region in a state in which the movable reflecting portion 24B is disposed at the first moving position becomes substantially the same direction of the direction of the reflected light from the lower region in the state in which the movable reflecting portion 24B is disposed at the reference position.

As shown by FIGS. 6 and 7, at the second moving position at which the movable reflecting portion 24B is moved further downward, light from the light source 22a directed to the upper reflecting face 36a and the lower reflecting face 36b of the second additional reflector 36 is blocked by the movable reflecting portion 24B. Therefore, light from the light source 22a is incident on the reflecting face 24Aa of the general reflecting portion 24A, the reflecting face 24Ba of the movable reflecting portion 24B, and the reflecting face 34a of the first additional reflector 34.

Further, at the second moving position, reflected light from the reflecting face 24Aa of the general reflecting portion 24A and reflected light from the reflecting face 34a of the first additional reflector 34 are irradiated forward by transmitting through the projection lens 28. At this occasion, the direction of the reflecting face 24Ba of the movable reflecting portion 24B is considerably changed to an upper direction by pivoting the movable reflecting portion 24B and therefore, reflected light from the reflecting face 24Ba becomes ineffective light without being incident on the projection lens 28.

Figure 8:
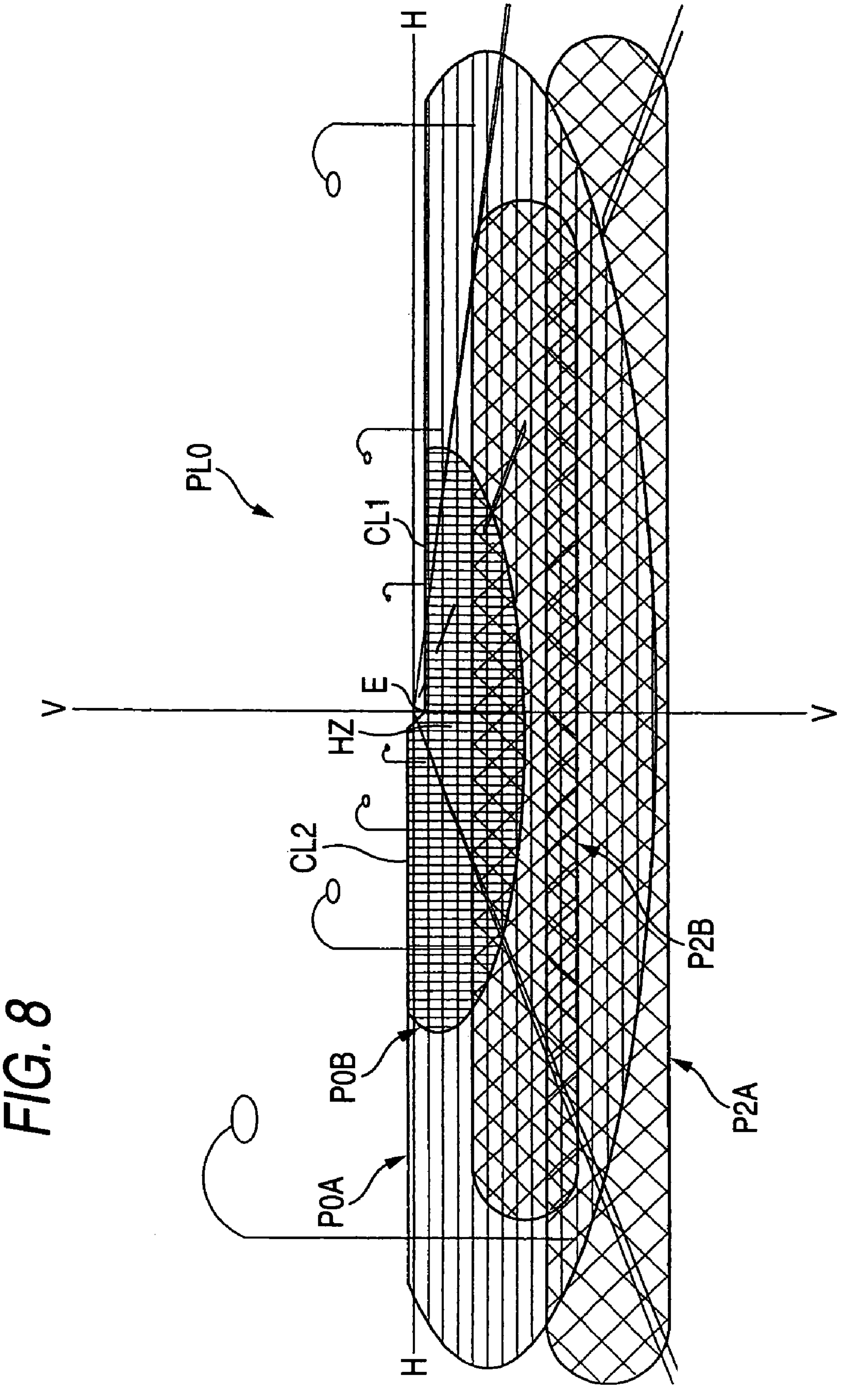
FIG. 8 is a view perspectively showing a low beam light distribution pattern formed on an imaginary vertical screen arranged at a position forward from the lamp piece by 25 m by light irradiated forward from the vehicle headlamp in the state in which the movable reflecting portion is disposed at the reference position.
Figure 9:
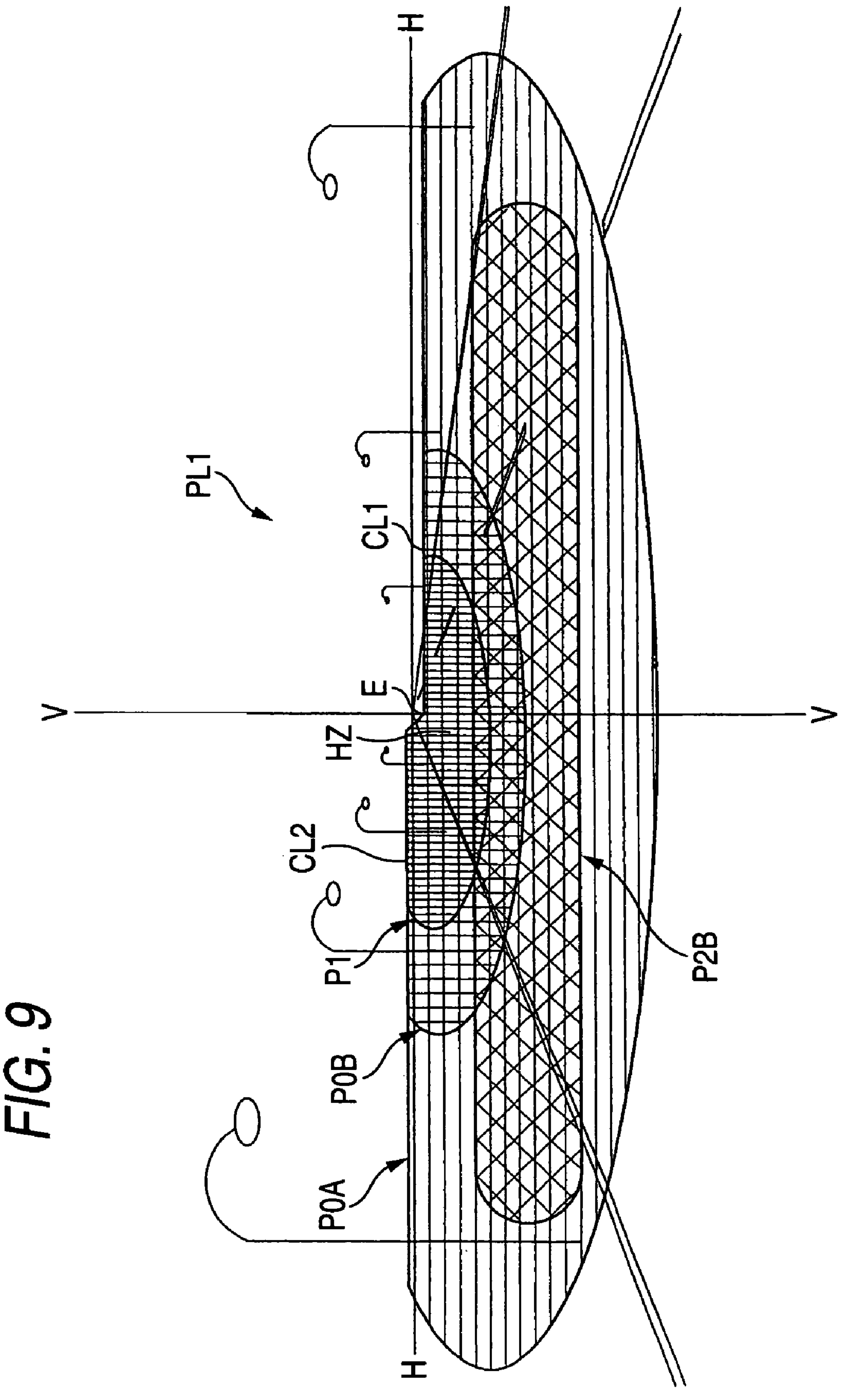
FIG. 9 is a view perspectively showing a low beam light distribution pattern formed on the imaginary vertical screen by light irradiated forward from the vehicle headlamp in the state in which the movable reflecting portion is disposed at the first moving position.
Figure 10:
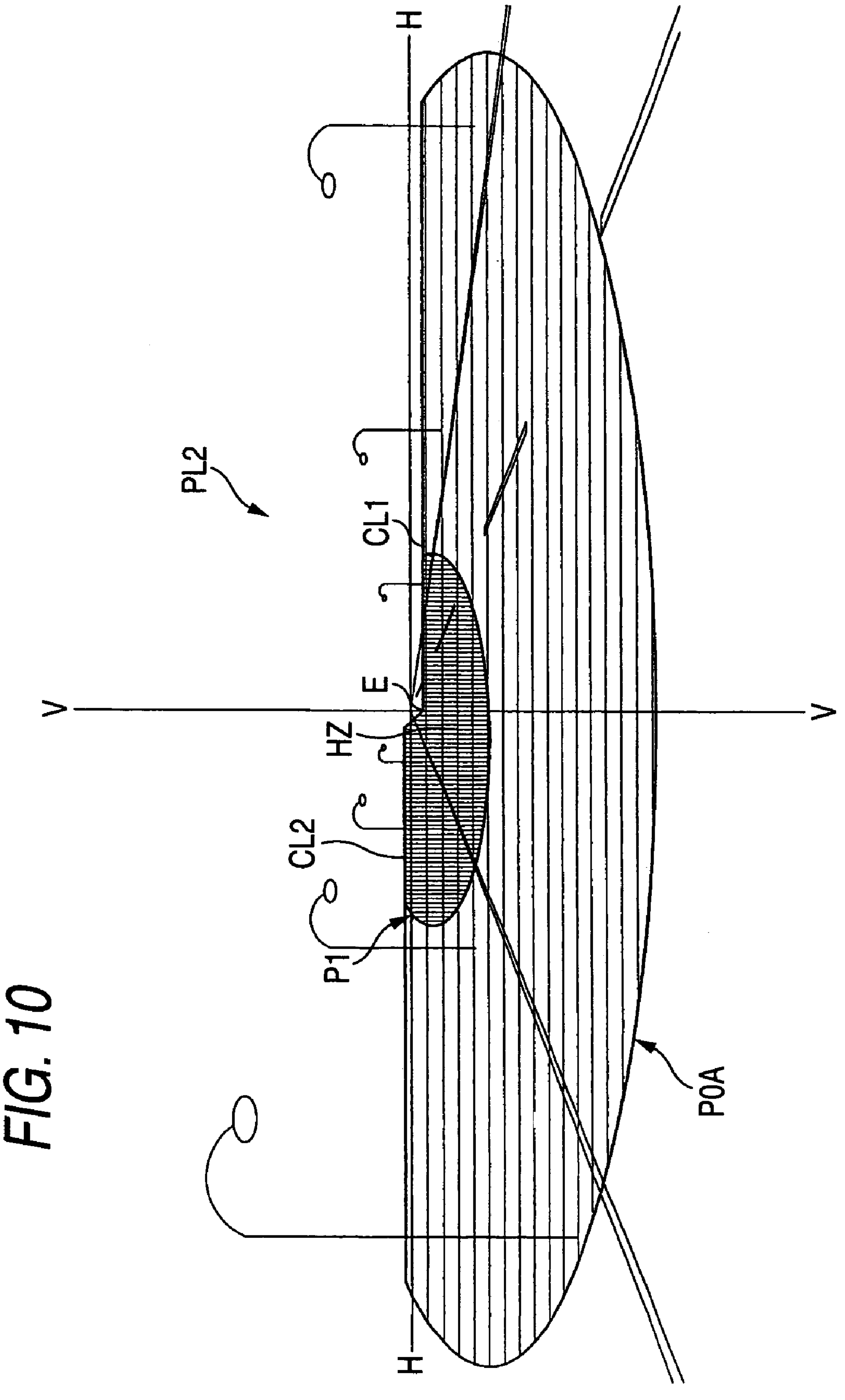
FIG. 10 is a view perspectively showing a low beam light distribution pattern formed on the imaginary vertical screen by light irradiated forward from the vehicle headlamp in the state in which the movable reflecting portion is disposed at the second moving position.

FIGS. 8 through 10 are views perspectively showing light distribution patterns formed on an imaginary vertical screen arranged at a position frontward from the lamp piece by 25 m by light irradiated forward from the vehicle headlamp 10.

FIG. 8 shows a light distribution pattern PL0 for low beam formed in the state in which the movable reflecting portion 24B is disposed at the reference position, FIG. 9 shows a light distribution pattern PL1 for low beam formed in the state in which the movable reflecting portion 24B is disposed at the first moving position, and FIG. 10 shows a light distribution pattern PL2 for low beam formed in the state in which the movable reflecting portion 24B is disposed at the second moving position.

Each of the low beam light distribution pattern PL0, PL1, PL2 is a low beam light distribution pattern of a left light distribution and is provided with cutoff lines CL1, CL2 having a stepped difference in a left and right direction at an upper end edge thereof. The cutoff lines CL1, CL2 are extended in a horizontal direction with a stepped difference therebetween by constituting a boundary by a V—V line passing H–V constituting a vanishing point in a direction of a front face of the lamp piece in a vertical direction, a portion on a side of an opposite lane on the right side of the V—V line is formed as a stepped down cutoff line CL1, and an own lane portion on the left side of the V—V line is formed as a stepped up cutoff line CL2 stepped up from the stepped down cutoff line CL1 via an inclined portion. In each of the low beam light distribution patterns PL0, PL1, PL2, a position of an elbow point E constituting an intersection of the stepped down cutoff line CL1 and the V—V line is set to a position downward from H–V by about 0.5 through 0.6°, and a hot zone HZ constituting a high luminance region is formed to surround the elbow point E slightly proximate to the left.

In this case, the low beam light distribution pattern PL0 shown in FIG. 8 is formed as a light distribution pattern synthesized with a diffusing basic light distribution pattern P0A, a converging basic light distribution pattern P0B, and two diffusing additional light distribution patterns P2A, P2B. Further, the low beam light distribution pattern PL1 shown in FIG. 9 is formed as a light distribution pattern synthesized with the diffusing basic light distribution pattern P0A, the converging basic light distribution pattern P0B, a converging additional light distribution pattern P1 and the diffusing additional light distribution pattern P2B. Further, the low beam light distribution pattern PL2 shown in FIG. 10 is formed as a light distribution pattern synthesized with the diffusing basic light distribution pattern P0A and the converging additional light distribution pattern P1.

FIGS. 11A to 11E are views of a plurality of light distribution patterns constituting elements constituting the respective low beam light distribution patterns PL0, PL1, PL2 of the respective light distribution patterns.

Figures 11A, 11B, 11C, 11D, 11E:
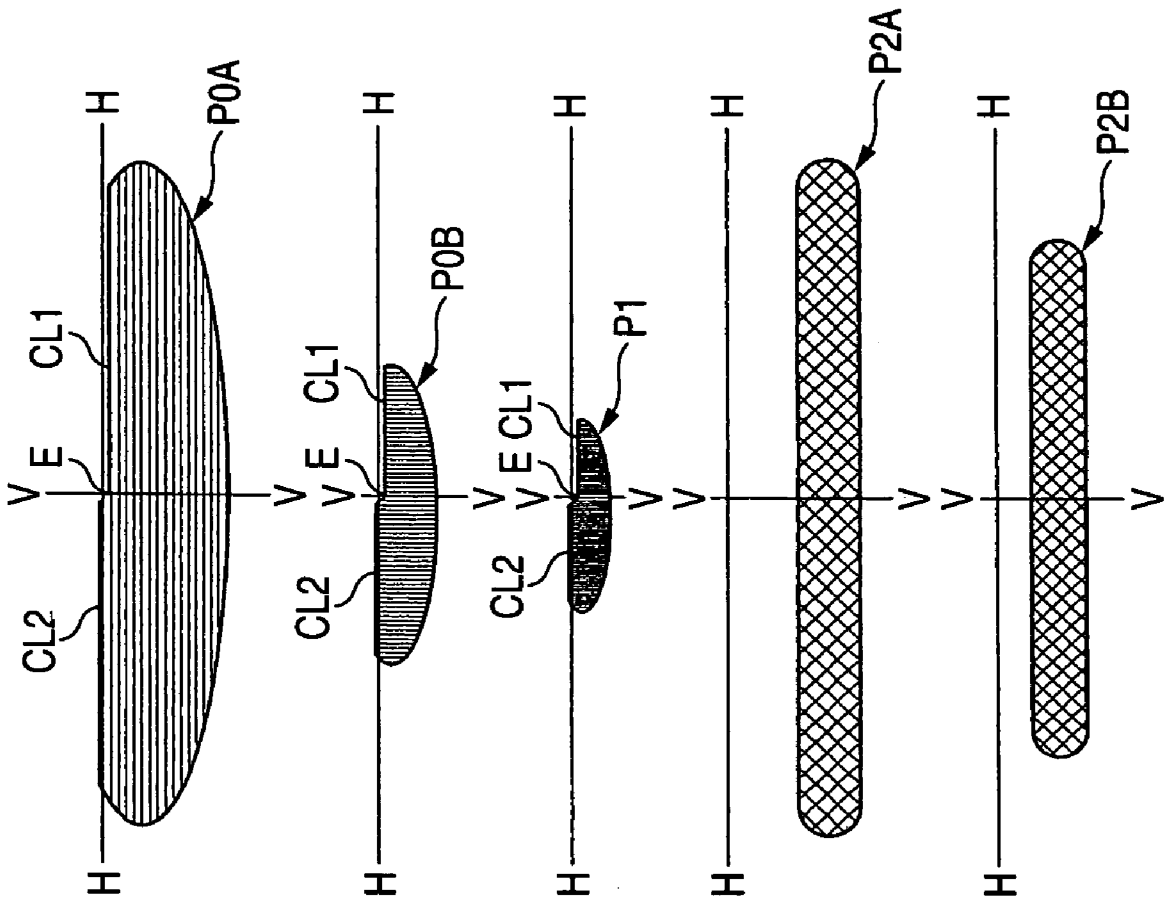
FIG. 11A is a view showing a diffusing basic light distribution pattern.
FIG. 11B is a view showing a converging basic light distribution pattern.
FIG. 11C is a view showing a converging additional light distribution pattern.
FIG. 11D is a view showing a diffusing additional light distribution pattern.
FIG. 11E is a view showing a diffusing additional light distribution pattern.

The diffusing basic light distribution pattern P0A shown in FIG. 11A is a light distribution pattern formed by light from the light source 22*a* reflected by the reflecting face 24Aa of the general reflecting portion 24A, and becomes a light distribution pattern constituting basic shapes of the respective low beam light distribution patterns PL0, PL1, PL2. In this case, reflected light from the general reflecting portion 24A is irradiated forward by transmitting through the projection lens 28 and therefore, the diffusing basic light distribution pattern P0A includes the cutoff lines CL1, CL2 as an inverted projected image of the upper end edge 32*a* of the shade 32 at an upper end edge thereof.

The converging basic light distribution pattern P0B shown in FIG. 11B is a light distribution pattern formed by light from the light source 22*a* reflected by the reflecting face 24Ba of the movable reflecting portion 24B disposed at the reference position, and becomes a comparatively small light distribution pattern surrounding the elbow point to be slightly proximate to the left. In this case, also reflected light from the movable reflecting portion 24B is irradiated forward by transmitting through the projection lens 28 and therefore, also the converging basic light distribution pattern P0B includes the cutoff lines CL1, CL2 at an upper end edge thereof.

The converging additional light distribution pattern P1 shown in FIG. 11C is a light distribution pattern formed by light from the light source 22*a* reflected by the reflecting face 34*a* at the first additional reflector 34 and becomes a light distribution pattern smaller and brighter than the converging basic light distribution pattern P0B as a light distribution pattern in a spot-like shape prolonged laterally surrounding the elbow point E to be slightly proximate to the left. At this occasion, also reflected light from the first additional reflector 34 is irradiated forward by transmitting through the projection lens 28 and therefore, also the converging additional light distribution pattern P1 includes the cutoff lines CL1, CL2 at an upper end edge thereof.

The diffusing additional light distribution pattern P2A shown in FIG. 11D is a light distribution pattern formed by light from the light source 22*a* reflected by the upper reflecting face 36*a* of the second additional reflector 36 and becomes a light distribution pattern slenderly extended in the left and right direction at a position remote downward from the H–H line passing H–V in the horizontal direction to some degree.

The diffusing additional light distribution pattern P2B shown in FIG. 11E is a light distribution pattern formed by light from the light source 22*a* reflected by the lower reflecting face 36*b* of the second additional reflector 36 and becomes a light distribution pattern slenderly extended in the left and right direction by an angle of diffusion slightly smaller than that of the diffusing additional light distribution pattern P2A at a position more proximate to the H—H line than the diffusing additional light distribution pattern P2A.

At this occasion, reflected light from each of the upper reflecting face 36*a* and the lower reflecting face 36*b* is irradiated forward without transmitting through the projection lens 28 and therefore, each of the diffusing additional light distribution patterns P2A, P2B does not include the cutoff lines CL1, CL2 at an upper end edge thereof.

As shown by FIG. 8, the low beam light distribution pattern PL0 formed in the state in which the movable reflecting portion 24B is disposed at the reference position is formed as a light distribution pattern synthesized with the diffusing basic light distribution pattern P0A, the converging basic light distribution pattern P0B, and the two diffusing additional light distribution patterns P2A, P2B and therefore, the vehicle front road face can widely be irradiated from a near distance region to a far distance region.

Therefore, optical recognizability of the vehicle front road face can sufficiently be ensured in running at an urban area by irradiating light by the low beam light distribution pattern PL0 in the low and middle vehicle speed region.

As shown by FIG. 9, the low beam light distribution pattern PL1 formed in the state in which the movable reflecting portion 24B is disposed at the first moving position is formed as a light distribution pattern synthesized with the diffusing basic light distribution pattern P0A, the converging basic light distribution pattern P0B, the converging additional light distribution pattern P1 and the diffusing additional light distribution pattern P2B and therefore, whereas the near distance region of the vehicle front road face is not irradiated so brightly, the vehicle front road face can be irradiated efficiently brightly from the middle distance region over to the far distance region by increasing brightness of the hot zone HZ.

Therefore, optical recognizability of the vehicle front road face can sufficiently be ensured in running on a high speed road or the like by irradiating light by the low beam light distribution pattern PL1 in the high vehicle speed region.

Further, at the first moving position, the converging basic light distribution pattern P0B is formed by reflected light not from all the region of the reflecting face 24Ba of the movable reflecting portion 24B but from the upper region and therefore, the converging basic light distribution pattern P0B becomes darker than the converging basic light distribution pattern P0B shown in FIG. 11B to some degree. Further, at the first moving position, the converging additional light distribution pattern P1 is formed by reflected light not from all the region of the reflecting face 34*a* of the first additional reflector 34 but from the upper region and therefore, the converging additional light distribution pattern P1 becomes darker than the converging additional light distribution pattern P1 shown in FIG. 11C to some degree.

As shown by FIG. 10, the low beam light distribution pattern PL2 formed in the state in which the movable reflecting portion 24B is disposed at the second moving position is formed as the light distribution pattern synthesized with the diffusing basic light distribution pattern P0A and the converging additional light distribution pattern P1 and therefore, whereas the near distance region of the vehicle front road face is irradiated quite brightly, the vehicle road face can be irradiated further brightly from the middle distance region over to the far distance region by further increasing the brightness of the hot zone HZ.

Therefore, by irradiating light by the low beam light distribution pattern PL2 in running under rainy weather, regularly reflected light of the wet vehicle front road face in the near distance region can be reduced, thereby, glare cast to the driver of a vehicle running on an opposite lane can be reduced.

As has been described in details, the vehicle headlamp 10 according to the embodiment is constituted as the vehicle headlamp of the projector type for irradiating light for forming the low beam light distribution pattern PL, a part of the reflector 24 is constituted to be movable downward by separating from the other general reflecting portion 24A of the reflector 24 as the movable reflecting portion 24B, a vicinity rearward from the movable reflecting portion 24B is arranged with the first additional reflector 34 for reflecting light from the light source 22*a* forward, at a position contiguous downward from the first additional reflector 34, the second additional reflector 36 for reflecting light from the light source 22*a* to direct forward without transmitting through the projection lens 28 is arranged, further, when the movable reflecting portion 24B is separated from the general reflecting portion 24A to move downward, light from the light source 22*a* is made to be incident on the first additional reflector 34 through the gap between the movable reflecting portion 24B and the general reflecting portion 24A, when the movable reflecting portion 24B is moved downward by a predetermined amount, light directed to the second additional reflector 36 from the light source 22*a* is constituted to block by the movable reflecting portion 24B and therefore, the following operation and effect can be achieved.

That is, at the reference position at which the movable reflecting portion 24B is not separated from the general reflecting portion 24A, reflected light from the general reflecting portion 24A of the reflector, reflected light from the movable reflecting portion 24B of the reflector 24, and reflected light from the second additional reflector 36 can be irradiated forward.

Further, at the first moving position at which the movable reflecting portion 24B is separated from the general reflecting portion 24A to move downward to some degree, whereas light from the light source 22*a* is incident on the upper region of the reflecting face 34*a* of the first additional reflector 34 through the gap between the movable reflecting portion 24B and the general reflecting portion 24A, light from the light source 22*a* to be incident on the upper reflecting face 36*a* of the second additional reflector 36 can be blocked by the movable reflecting portion 24B. Further, thereby, reflected light from the general reflecting portion 24A of the reflector 24, reflected light from the upper region of the first additional reflector 34, and reflected light from the lower reflecting face 36*b* of the second additional reflector 36 can be irradiated forward. At this occasion, according to the embodiment, also reflected light from the upper region of the movable reflecting portion 24B can be irradiated forward.

Further, at the second moving position at which the movable reflecting portion 24B is moved further downward (that is, moved by a predetermined amount), whereas light from the light source 22*a* is incident on the total region of the reflecting face 34*a* of the first additional reflector 34 through the gap between the movable reflecting portion 24B and the general reflecting portion 24A, all of light from the light source 22*a* to be incident on the upper reflecting face 36*a* and the lower reflecting face 36*b* of the second additional reflector 36 can be blocked by the movable reflecting portion 24B. Further, thereby, reflected light from the general reflecting portion 24A of the reflector 24, and reflected light from the first additional reflector 34 can be irradiated forward.

Therefore, according to the embodiment, by moving the movable reflecting portion 24B of the reflector 24 to any position of the reference position, the first moving position and the second moving position, the light distribution pattern can be formed in three kinds of modes. Further, thereby, optical recognizability of the vehicle front road face can be promoted by forming the light distribution pattern in accordance with the vehicle running situation. Further, the light distribution pattern in accordance with the vehicle running situation can be realized by driving the single stepping motor 40.

Further, according to the embodiment, there is constructed a constitution of switching the modes by moving the movable reflecting portion 24B having a light reflection control function and therefore, in comparison with the case of switching the modes by opening and closing a shutter as in the background art, light from the light source 22*a* can effectively be utilized.

Further, according to the embodiment, the first additional reflector 34 is constituted to include a shape of the reflecting face having a high convergence of light to the vicinity of the rear side focal point F of the projection lens 28 and therefore, the converging additional light distribution pattern P1 formed by reflected light from the first additional reflector 34 can be formed as the light distribution pattern in the spot-like shape brighter than the converging basic light distribution pattern P0B formed by reflected light from the movable reflecting portion 24B. Further, thereby, at the first moving position, remote optical recognizability can be promoted more than at the reference position, and at the second moving position, remote optical recognizability can further be promoted than at the first moving position. At this occasion, the reflecting face 34 of the first additional reflector 34 is constituted by the shape of an ellipsoid of revolution constituting the first focal point by light emitting center of the light source 22*a* and constituting the second focal point by the point at the vicinity of the rear side focal point F of the projection lens 28 and therefore, convergence of light to the vicinity of the rear side focal point F can maximally be promoted.

Further, according to the embodiment, the second additional reflector 36 is constituted to reflect light from the light source 22*a* to direct to the near distance region of the vehicle front road face and therefore, the following operation and effect can be achieved.

That is, at the reference position, by brightly irradiating the near distance region of the vehicle front road face by reflected light from the second additional reflector 36, the low beam light distribution pattern PL0 suitable for running in an urban area or the like can be provided. Further, at the first moving position, by darkening the near distance region of the vehicle front road face by reducing reflected light from the second additional reflector 36, optical recognizability of the far distance region is relatively promoted, thereby, the low beam light distribution pattern PL1 suitable for high speed running or the like can be provided. Further, at the second moving position, by nullifying reflected light from the second additional reflector 36, even in the case in which the vehicle front road face becomes wet, regularly reflected light at the near distance region can be reduced and therefore, glare cast to a driver of a vehicle running on an opposite lane can be reduced, thereby, the low beam light distribution pattern PL2 suitable for running under rainy weather or the like can be provided.

At this occasion, according to the embodiment, the reflecting face of the second additional reflector 36 is constituted by the upper reflecting face 36*a* and the lower reflecting face 36*b*, the diffusing additional light distribution pattern P2A is formed at the near distance region of the vehicle front road face by reflected light from the upper reflecting face 36*a*, the diffusing additional light distribution pattern P2B is formed on a side remoter than the diffusing additional light distribution pattern P2A by reflected light from the lower reflecting face 36*b* and therefore, when the movable reflecting portion 24B is moved from the reference position to the first moving position and further to the second moving position, the two diffusing additional light distribution patterns P2A, P2B can be vanished successively from the diffusing additional light distribution pattern P2A disposed on the near side.

According to the embodiment, the movable reflecting portion 24B is constituted to move by pivoting movement constituting the pivoting center by the point at the vicinity of the front side of the light source 22*a* and therefore, at the first moving position, reflected light from the upper region of the reflecting face 24Ba of the movable reflecting portion 24B can be made to be incident on the projection lens 28 to irradiate forward. Further, thereby, when the modes are switched between the reference position and the first moving position or when the modes are switched between the first moving position and the second moving position, the low beam light distribution patterns PL0, PL1, PL2 can be prevented from being considerably disturbed beforehand.

According to the embodiment, the light source bulb 22 is inserted to fix to the reflector 24 from a side direction of the optical axis Ax and therefore, by shortening a length in a front and rear direction of the lamp piece, compact formation thereof can be achieved. Further, the light source bulb 22 is inserted to fix to the position remote downward from the optical axis Ax and therefore, a region on a side of the optical axis of the reflecting face 24Aa of the general reflecting portion 24A of the reflector 24 can effectively be utilized for controlling light distribution. That is, by forming a region of diffusing the diffusing basic light distribution pattern P0A by reflected light from the side region of the optical axis, sufficient brightness can be ensured at the diffusing regions of the low beam light distribution patterns PL0, PL1, PL2.

According to the embodiment, the movable reflecting portion 24B is arranged substantially right behind the light source 22*a*, the second additional reflector 36 is arranged downward from the movable reflecting portion 24B and therefore, a sufficient incident light flux with respect to light from the light source 22*a* can be ensured with regard to any of the general reflecting portion 24B, the movable reflecting portion 24B, the first additional reflector 34 and the second additional reflector 36.

Further, according to the embodiment, a position of separating an upper end edge of the movable reflecting portion 24B and a lower end edge of the general reflecting portion 24B is set to a position of a height substantially the same as that of the optical axis Ax and therefore, all of a reflecting region upward from the optical axis Ax can be ensured as the general reflecting portion 24A. Therefore, the diffusing basic light distribution pattern P0A can be formed as the light distribution pattern the diffusion region of which is sufficiently bright by reflected light from the general reflecting portion 24A.

According to the embodiment, the shade 32 for blocking a part of reflected light from the reflector 24 is arranged to dispose the upper end edge 32*a* at a vicinity of the optical axis at the vicinity of the rear side focal point F of the projection lens 28 and therefore, the low beam light distribution patterns PL0, PL1, P12 having the cutoff lines CL1, CL2 at the upper end edges can be formed. Further, the first additional reflector 34 is constituted to make light from the light source 22*a* reflected by the first additional reflector 34 incident on the projection lens 28 and therefore, also with regard to the converging additional light distribution pattern P1 formed by reflected light from the first additional reflector 34 can be made to include the cutoff lines CL1, CL2 at the upper end edges, thereby, remote optical recognizability can be promoted without casting glare to a driver of a vehicle running on an opposite lane.

Incidentally, although according to the above-described embodiment, there is constructed the constitution in which the position of the movable reflecting portion 24B is fixed to the reference position in the low and middle vehicle speed region (for example, vehicle speed region equal to or slower than 60 km/h), fixed to the first moving position at the high vehicle speed region (for example, vehicle speed region exceeding 60 km/h) and fixed to the second moving position in running under rainy weather, the other constitution can naturally be adopted. For example, there can be constructed a constitution in which the position of the movable reflecting portion 24B is fixed to the reference position in a low vehicle speed region (for example, vehicle speed region equal to or slower than 40 km/h), fixed to the first moving position in a middle vehicle speed region (for example, vehicle speed region of 40 through 70 km/h) and fixed to the second moving position in a high vehicle speed region (for example, vehicle speed region exceeding 70 km/h) and in running under rainy whether. When constituted in this way, in the case in which the movable reflecting portion 24B is disposed at the second moving position, the near distance region of the vehicle front road face becomes sufficiently dark, the far distance region becomes sufficiently bright and therefore, optical recognizability of the vehicle front road face in running at high speed can considerably be promoted.

Further, although in the embodiment, an explanation has been given such that the light distribution pattern formed by reflected light from the first additional reflector 34 is the converging additional light distribution pattern P1, by pertinently changing a shape of a surface of the reflecting face 34*a* of the first additional reflector 34, the other light distribution pattern (for example, a light distribution pattern for wide diffusion diffused considerably in the left and right direction) can also be formed.

Further, although according to the embodiment, an explanation has been given such that the first additional reflector 34 is integrally formed with the general reflecting portion 24A of the reflector 24, the first additional reflector 34 may be constituted to be formed separately therefrom. Similarly, although according to the embodiment, an explanation has been given such that the second additional reflector 36 is integrally formed with the first additional reflector 34, the second additional reflector 36 may be constituted to form separately therefrom.

Further, although according to the embodiment, an explanation has been given such that the light source bulb 22 is inserted to fix to the reflector 24 from a right transverse direction, even when the inserting angle is shifted more or less from the right transverse direction, so far as the shift in an up and down direction or a front and rear direction is equal to or smaller than about 30°, operation and effect substantially similar to those of the embodiment can be achieved.

Further, instead of constructing the constitution of inserting to fix the light source bulb 22 to the reflector 24 from the right transverse direction as in the embodiment, a constitution of inserting to fix the light source bulb 22 to the reflector 24 from a rear side on the optical axis Ax can also be constructed.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens arranged on an optical axis extended in a front and rear direction of a vehicle;

a light source arranged on a side rearward from a rear side focal point of the projection lens;

a reflector for reflecting light from the light source to direct forward to be proximate to the optical axis, the reflector including a general reflecting portion and a movable reflecting portion movable in a predetermined direction to separate from the general reflecting portion;

a first additional reflector, arranged at a vicinity of a rear side of the movable reflecting portion, for reflecting the light from the light source to direct forward; and a second additional reflector, arranged at a position substantially contiguous to the first additional reflector in the predetermined direction, for reflecting the light from the light source to direct forward without transmitting through the projection lens.

2. The vehicle headlamp according to claim 1, when the movable reflecting portion is moved in the predetermined direction so as to be separated from the general reflecting portion, the light from the light source is incident to the first additional reflector through a gap between the movable reflecting portion and the general reflecting portion, and when the movable reflecting portion is moved in the predetermined direction by a predetermined amount, the light directed to the second additional reflector from the light source is blocked by the movable reflecting portion.

3. The vehicle headlamp according to claim 1, wherein the first additional reflector comprises a reflecting face having a high convergence to a vicinity of the rear side focal point.

4. The vehicle headlamp according to claim 1, wherein the second additional reflector reflects the light from the light source to a near distance region of a vehicle front road face.

5. The vehicle headlamp according to claim 1, wherein the movable reflecting portion is moved by a pivoting movement with a pivoting center at a vicinity of the light source.

6. The vehicle headlamp according to claim 1, wherein the light source is constituted by a light emitting portion of a light source bulb inserted to fix to the reflector from a side direction of the optical axis at a position remote downward from the optical axis.

7. The vehicle headlamp according to claim 6, wherein the movable reflecting portion is arranged behind the light source, the second additional reflector is arranged on a lower side of the movable reflecting portion, and a position of separating an upper end edge of the movable reflecting portion and a lower end edge of the general reflecting portion is arranged at a height substantially the same as a height of the optical axis.

8. The vehicle headlamp according to claim 1, further comprising:

a shade, for blocking a part of reflected light from the reflector, arranged at the vicinity of the rear side focal point such that an upper end edge of the shade is disposed at a vicinity of the optical axis.

9. The vehicle headlamp according to claim 1, wherein the movable reflecting portion is movable between a reference position, a first moving position, and a second moving position, wherein the movable reflecting portion is not separated from the general reflecting portion, at the reference position, the movable reflecting portion is separated from the general reflecting portion to some degree in the predetermined direction, at the first moving position, and the movable reflecting portion is further moved in the predetermined direction, at the second moving position.

10. The vehicle headlamp according to claim 9, when the movable reflecting portion is at the reference position, reflected light from the general reflecting portion, reflected light from a part of the movable reflecting portion and reflected light from a part of the second additional reflector are irradiated forward, when the movable reflecting portion is at the first moving position, the reflected light from the general reflecting portion, reflected light from a part of the first additional reflector, and reflected light from a part of the second additional reflector are irradiated forward, and when the movable reflecting portion is at the second moving position, the reflected light from the general reflecting portion and reflected light from the first additional reflector are irradiated forward.

11. The vehicle headlamp according to claim 1, wherein the general reflecting portion and the movable reflecting portion have respective reflecting faces provided with sectional shapes substantially in elliptically shapes with eccentricities gradually increasing from respective vertical sections to horizontal sections, the first additional reflector has a reflecting face provided with a shape of an ellipsoid of revolution constituting a first focal point by a light emitting center of the light source and a second focal point at a vicinity of the rear side focal point of the projection lens, and the second additional reflector has a reflecting face provided with a vertical sectional shape constituted by a parabola having a focal point at the light emitting center of the light source, and a horizontal sectional shape constituted by a hyperbola having a focal point at the light emitting center of the light source.

* * * * *